United States Patent [19]
Bloomfield

[11] 3,788,231
[45] Jan. 29, 1974

[54] VALVE FOR LEVITATED VEHICLE TRACK
[75] Inventor: Roger D. Bloomfield, Jackson, Wyo.
[73] Assignee: Uniflo Systems Company, Edina, Minn.
[22] Filed: May 8, 1972
[21] Appl. No.: 251,316

Related U.S. Application Data
[62] Division of Ser. No. 37,691, May 15, 1970, Pat. No. 3,685,788.

[52] U.S. Cl. ........... 104/23 FS, 104/134, 214/1 BE, 137/487
[51] Int. Cl. ............................................ B61b 13/08
[58] Field of Search ............... 251/28, 61.1, 45, 46; 137/454.2, 487; 104/23 FS, 134; 214/1 BE; 302/29

[56] References Cited
UNITED STATES PATENTS
| | | | |
|---|---|---|---|
| 2,651,549 | 9/1953 | Ross | 302/29 |
| 3,257,964 | 6/1966 | Conners | 104/23 FS |
| 3,685,788 | 8/1972 | Bloomfield | 104/134 |
| 3,603,647 | 9/1971 | Ariem | 302/29 |
| 3,540,378 | 11/1970 | Giraud | 104/23 FS |

*Primary Examiner*—Gerald M. Forlenza
*Assistant Examiner*—D. W. Keen
*Attorney, Agent, or Firm*—Dugger, Johnson & Westman

[57] ABSTRACT

A pilot operated valve for use in combination with a track which supplies air for levitating a vehicle for movement along the track. The valve may be automatically actuated by pilot pressure built up underneath the vehicle, and is self-closing after the vehicle has passed. Pilot operation is provided to insure rapid and accurate operation, and also control pressure conduits can be provided for making the valve open in response to signals other than air pressure rise underneath a levitated vehicle.

9 Claims, 6 Drawing Figures

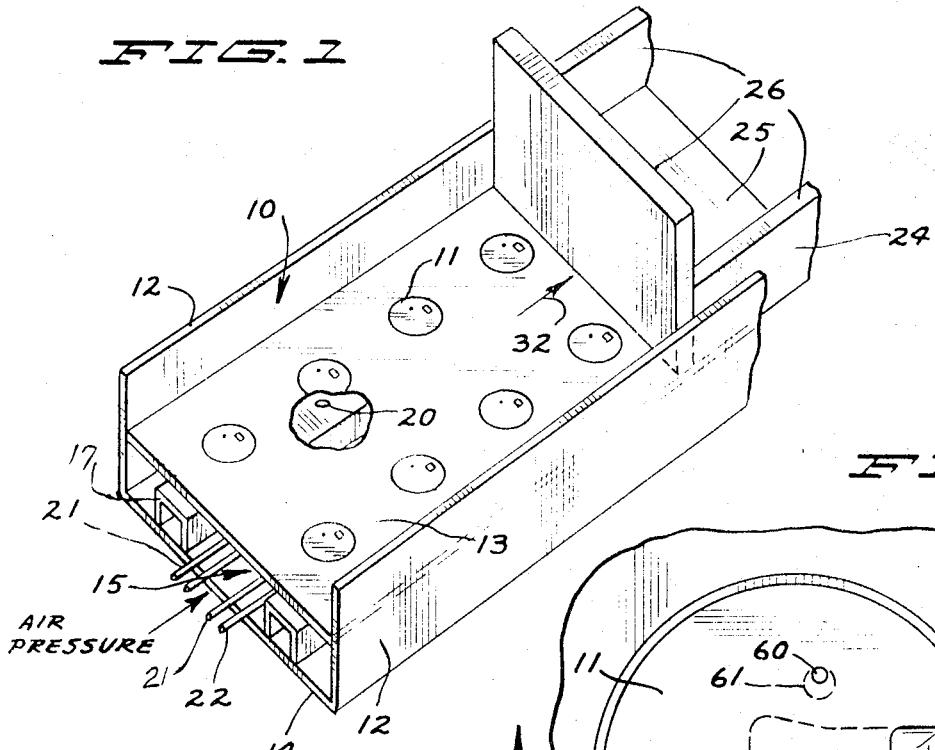
FIG. 1
FIG. 2
FIG. 3
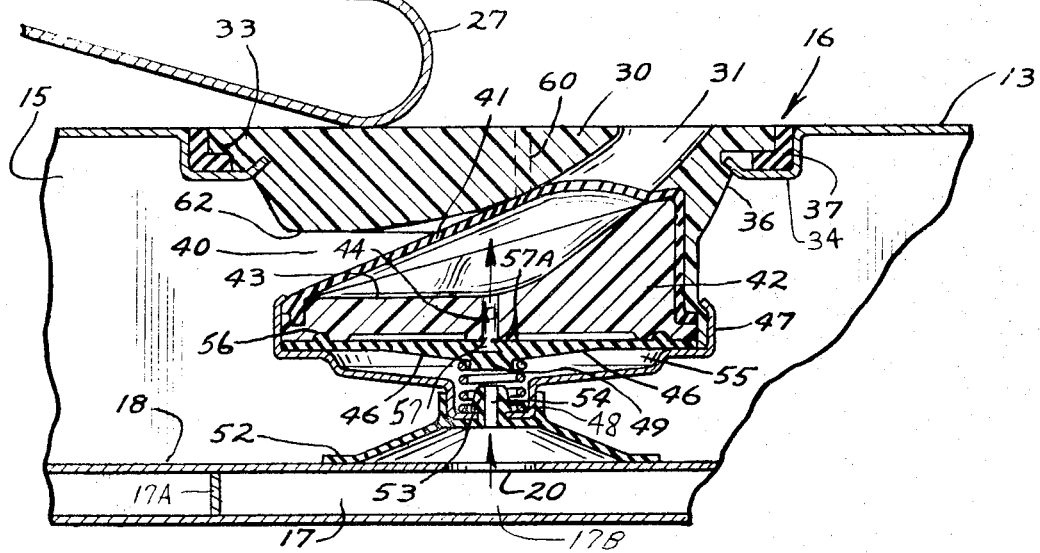

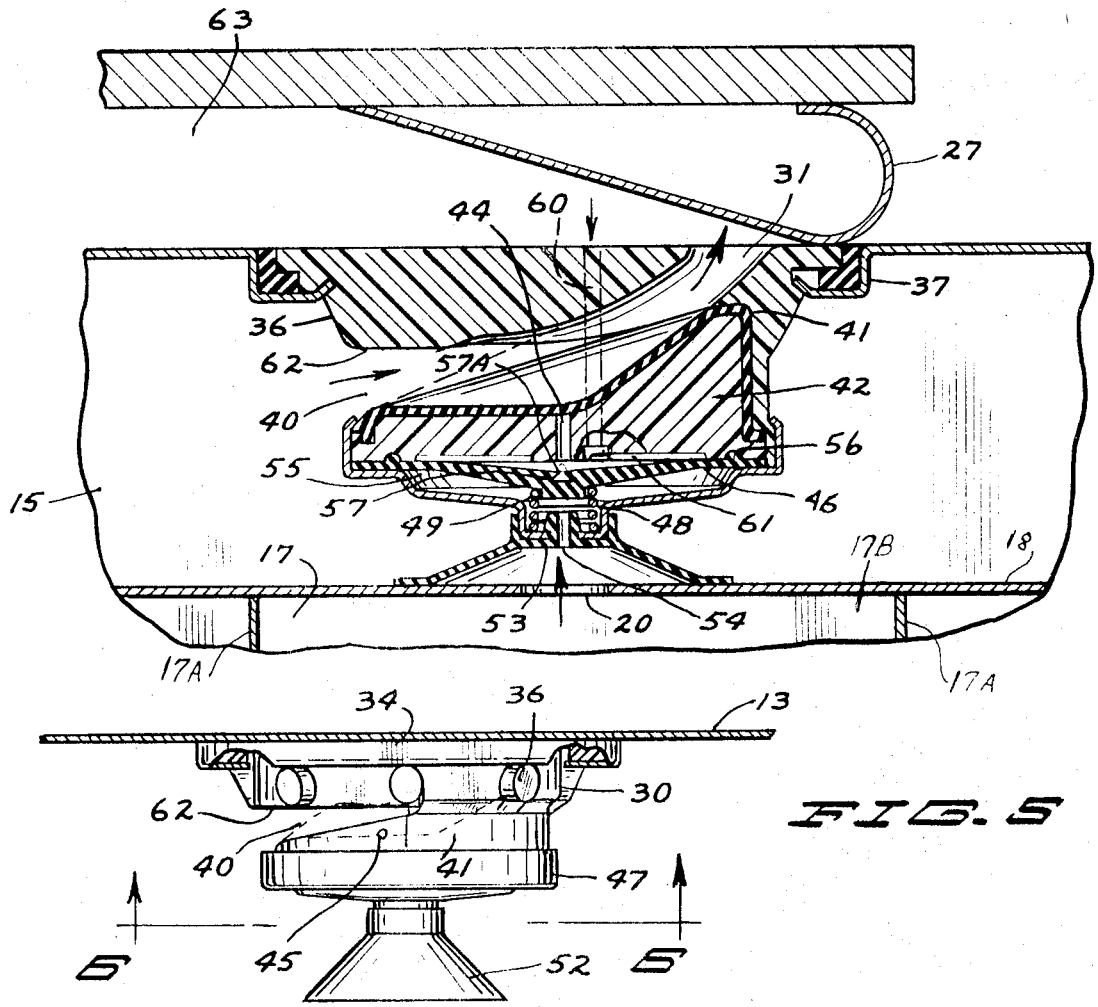
FIG. 4
FIG. 5
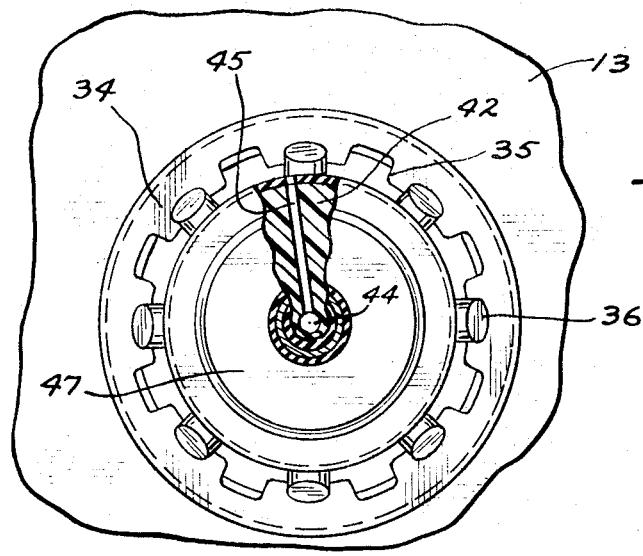
FIG. 6

VALVE FOR LEVITATED VEHICLE TRACK

CROSS REFERENCE TO RELATED APPLICATION

This application is a divisional application of my copending application Ser. No. 37,691, Filed May 15, 1970 for Valve For Levitated Vehicle Track now U.S. Pat. No. 3,685,788.

BACKGROUND OF THE INVENTION

1. Field of the Invention

A valve device for use with air levitated vehicles which can be actuated in response to a vehicle or control pressure.

2. Prior Art

The advance of air levitated vehicles has brought about various valve designs for operation therewith.

For example, in the patent to Flexman et al, U.S. Pat. No. 3,081,886, a pilot operated mechanically actuated valve is shown. The Flexman et al valve senses pressure and operates a linkage through a large pilot diaphragm to open a valve to give levitation fluid underneath the vehicle.

The patent to Bouladon et al, U.S. Pat. No. 3,279,863, also shows a different form of pilot operated valve for a levitated vehicle, wherein the valve itself is movable in the floor and opens ports to a conduit or plenum chamber used for the vehicle.

SUMMARY OF THE INVENTION

The present invention relates to a pressure-operated valve for air levitated vehicles which is pilot operated, and can be opened in response to fluid pressure under the levitated vehicle, or which may be actuated in response to a separate control pressure, as desired. The valve structure operates in a positive manner once the pilot actuating pressure is at the right level for operation, and utilizes relatively soft sealing diaphragms for operation. The valve units are self-contained, and can be removed with a simple twist lock mechanism from the floor or track used for the levitated vehicle, and have a self-sealing connecting to the respective control conduits or headers to make quick removal and replacement easy. The major portions of the valve can be simply molded from plastic materials, the diaphragms made of molded elastomeric materials, and very little machine work is necessary.

The pilot pressure sensing ports are self-cleaning upon actuation because a reverse puff of air is exhausted out through the pilot ports once the valve has been actuated to insure that any dirt that may have been injected into the pilot port or passageway would be blown clear. The valve operation is positive even with small differentials in pressure between the source of pressure and atmosphere.

A control diaphragm construction utilizing a sealing lip construction for obtaining a snap action type of seal for a passageway is also disclosed.

BRIEF DESCRIPTION OF THE DRAWINGS

FIG. 1 is a fragmentary perspective view of an air levitated vehicle and track showing a valve made according to the present invention installed therein;

FIG. 2 is a fragmentary top plan view of the valve device of the present invention;

FIG. 3 is a fragmentary enlarged sectional view taken as on line 3—3 in FIG. 2 and schematically showing a portion of an air leviated vehicle;

FIG. 4 is a view taken substantially as FIG. 3 but showing the valve in actuated or open position;

FIG. 5 is a side elevational view of the valve of the present invention shown installed in a vehicle track; and FIG. 6 is sectional view taken as on line 6—6 in FIG. 5 with parts broken away to show a fluid passageway.

DESCRIPTION OF THE PREFERRED EMBODIMENT

FIG. 1 illustrates a fragmentary perspective view of a levitated vehicle track illustrated generally at 10 which has valve assemblies illustrated generally at 11 installed therein. The valve assemblies are made according to the present invention.

The track 10 is made of a pair of oppositely disposed substantially parallel side walls 12,12, a main support platform 13, and a bottom wall 14 that forms a chamber 15.

As shown, the valves 11 are placed in two substantially parallel rows and in opposed pairs transversely spaced across the floor 13. The valves 11 are inserted in provided openings 16 in the floor 13, and the openings are positioned above control pressure headers 17. The headers 17 may have walls 17A so that there is an individual chamber 17B for each of the valves 11. The chambers are formed with enclosed walls, and include a top wall 18 which is parallel to the wall 13, and is spaced below the wall 13 a predetermined distance so that when the valve 11 is positioned in wall 13, the control portions of the valve will be in communication with an opening 20 provided in the top wall 18 of the control pressure header. Control pressure conduits 21 and 22 are provided and these extend along the plenum chamber 15. The conduits 21 and 22 are connected to sources of fluid pressure used for control purposes. The conduits 21 and 22 are connected to the control pressure headers 17 so that the proper control pressure will be available at each of the valves. One of the control pressure conduits opens to each of the chambers for providing control fluid pressure to each valve 11. If desired, the conduits may be used as separate headers and the valves would be connected to either one or the other of the conduits and grouped as desired.

A levitated vehicle illustrated generally at 24 has a primary load supporting platform 25, and can have end and side walls illustrated at 26 for holding a load to be conveyed along the track 10. For example, the levitated vehicle 24 could be used for carrying baggage in an airline terminal, or commodities in a warehouse where the levitated track is to be utilized. The platform 25 has a peripheral bag type seal illustrated generally at 27 around the peripheral edges thereof.

In the operation of the unit, the levitated vehicle is lifted with a cushion of fluid pressure greater than atmosphere underneath the platform 25, and the bottom edge of the seal 27 will just barely clear the surface of the wall 13. The vehicle will be moved along the track by properly directing the air coming through the valves 11 from the plenum chamber 15.

Each of the valves 11 comprises a main housing 30 which has a nozzle 31 defined therein. The nozzle 31 is directed at an angle with respect to the vertical, so that fluid, such as air, issuing from this nozzle will tend to propel any vehicle 25 above the valve when it is opened in a direction along the track, for example the direction indicated by the arrow 32. The main housing 30 of the valve is provided with an overhanging shoulder 33 that fits over a peripheral support lip 34 offset downwardly from the floor 13. The inner peripheral edge of support lip 34 is serrated, as shown in FIG. 6, to have a plurality of lugs 35 and alternate open spaces.

Spaced below the shoulder 33 of the valve body outwardly protruding bosses 36 are provided on the valve body. The bosses 36 are spaced around the periphery also shown in FIG. 6, and these bosses are made so that they will fit under the lugs 35. The entire valve assembly can thus be "twist locked into place" by inserting the valve into the opening defined by lip 34 so the bosses 36 go between adjacent lugs 35, and then after the valve is inserted, twist locking the valve so bosses 36 are held under lugs 35. A resilient gasket 37 provides for a resilient force which will hold the bosses 36 in engagement with the members 35 after they have been locked in place and also seals the openings into which the valves are placed. The upper surface of the valve 11 is substantially coplanar with the surface of the floor or upper wall 13.

The nozzle 31 extends from and is open to a fluid passageway 40 that opens to the plenum chamber 15. Flow through this passageway 40 and nozzle 31 is controlled by a flexible elastomeric diaphragm 41. One surface of the diaphragm 41 defines a side of the fluid passageway 40. As shown, the housing 30 for the valve is made into several sections, for assembly purposes, and the diaphragm 41 is mounted over a valve block 42 (the diaphragm is cup shaped), and a second surface of the diaphragm rests against a contoured upper surface 43 of the block 42 when the diaphragm is relaxed. The block 42 has a central axially extending passageway 44. This passageway 44 is also open through a small flow restricting passageway 45 which extends through the block 42 and through the peripheral edge wall of the diaphragm 41, as shown in FIG. 5, so that passageway 45 is open to the plenum chamber 15.

A control diaphragm 46 is mounted on the opposite side of block 42 from surface 43, and is held in place with a retainer cap 47 that is swagged or bent over around the main portion of the valve block 42, holds block 62 in place in the assembly and holds the entire valve assembly together, including a top member in which the nozzle 31 is formed. The retainer cap 47 holds a very light spring 48 against a centering boss 49 on the diaphragm 46. A flexible cup 52, which is shaped just like a suction cup, in other words is annular and somewhat conically shaped, is fitted over a protruding neck on the retainer cap 47. The flexible cup itself has a center retainer neck 53 that passes through an opening in the neck of the retainer cap. The center neck 53 has a control pressure passageway 54 defined therein. This control pressure passageway opens into the chamber 55, which is a control pressure chamber, defined by the cap 47. The flexible cup 52 forms a flexible or resilient sealing member on the valve that seals against the header and defines a control pressure passageway to the valve from the valves control pressure chamber when the valve is positioned in wall 13. The neck 53 fits inside the spring 48 and is directly below the elastomeric flexible control pressure diaphragm 46 which closes chamber 55. Control pressure diaphragm 46 has an annular rib 56 defined therein which fits into a recess in the block 42. As shown, the neck 53 is provided with a protrusion that will engage the inner surface of the neck on the retainer cap and hold the sealing suction type cup 52 in place.

The diaphragm 46 is provided with a small frusto-conical interior sealing chamber 57 defined in the center thereof and which is open through an opening aligned with the passageway 44. The small frusto-conical chamber 57 forms an annular thin lip 57A that seals against the surface of the block 42 around the passageway 44. The annular lip member 57A is very thin around its edges, and, being elastomeric and flexible, will flex or bend to accommodate the local irregularties around the passageway 44.

A pilot pressure or sensing passageway 60 is open through the valve block 30 from the upper surface thereof, and passes down through the wall of the valve block 30 and opens into a larger diameter recess 61 defined in the bottom surface of block 42 (opposite from surface 43). The recess 61 is thus open to the upper side or surface of diaphragm 46, while the chamber 55 is open to the opposite side of the diaphragm 46.

The wall 18 of the control header 17 is positioned a predetermined distance from the wall 13 so that when the valve 11 is locked on the lugs 35, the outer peripheral edges of the sealing cup 52 for control pressure to the valve surrounds the opening 20 from the control pressure chamber for that particular valve, and seals so that the control pressure will not leak out around the peripheral edges of the cup 52. The control pressure is supplied to chamber 55 through the cup 52 and passageway 54. Thus there is an automatic positioning of the valve assembly with respect to its control pressure chamber, and an automatic sealing once the valve is twist locked into place. The entire valve assembly can be removed merely by twisting it, and a suitable spanner wrench used with openings in the top surface of the valve for operation can be provided.

The entire valve can be easily removed and discarded if it becomes inoperative, and a new valve placed into service. In addition, of course the valves can be serviced after they have been removed.

The operation of the valve 11 is by pressure differentials, and there are actually no pivoting mechanically moving parts. In normal operation, the pressure in the plenum chamber 15 will be approximately 2 pounds per square inch higher than atmospheric pressure.

When there is no levitated vehicle above the valve, the pressure at nozzle 31 will be lower than the pressure at the passage end 40. Assuming automatic operation, the pressure inside the chamber 55 will be substantially the same as that in pressure pilot conduit 60 (at atmospheric). The spring 40 will provide a sufficient resilient bias to push the diaphragm 46 up against the block 42 and the lips 57A will seal around the bottom edge of the opening 44. Pressure from the plenum chamber 15 will communicate with the passageway 44 through passageway 45 causing duct pressure on the inside of the frusto-conical opening 57 and forcing the lip edges 57A against the surface of the block around the passageway 44.

The fluid pressure acting through passageway 45 and passageway 44 will act on the bottom side of the diaphragm 41 and because of the lower pressure in nozzle 31 will force it upwardly as shown in FIG. 3. The differential in pressure will cause the sealing of the diaphragm 41 against the opposite side or upper side surfaces of the passageway 40. This will prevent air or fluid under pressure from escaping out through the nozzle 31. It should be noted that the sealing surface shown at 62 is a planar surface extending across the valve, and that the diaphragm 41 billows up as shown in dotted lines in FIG. 5 for the sealing position. The surface of the diaphragm 41 that defines part of passageway 40 seals all the way across the passageway 40. The nozzle 31 extends only part way across surface 62, so there is a sealing against surface 62 around the entrance to the nozzle 31 and the flow of fluid is shut off completely. Note also that the surface 43 of block 42 is depressed in the center portion to enlarge the effective area of passageway 40 when the diaphragm is in open condition.

Assuming that the levitated vehicle, having the seal 27, is moving along in automatic operation, there will be fluid pressure under the vehicle which is higher than atmospheric pressure. The fluid pressure for levitation is present in chamber 63 defined by seal 27. As the vehicle moves along, the edge of chamber 63 will overlie the pilot passageway 60. There will then be a pressure rise in the passageway 60, and thus in the recess 61. This higher than atmospheric pressure, which probably is about half of the pressure in plenum chamber 15, or about 1 pound per square inch above atmospheric, acts on the upper surface of the diaphragm 46. This pressure area is sufficiently large to move the diaphragm 46 away from the bottom surface of block 42 and overcomes the force of spring 48. The diaphragm 46 will move downwardly, and actually snap the sealing lips 57A away from the passageway 44. This will then open a pressure bleed path from under diaphragm 41 through the passageway 44, 61 and 60 to a lower pressure under the levitated vehicle. Because the passageway 45 is much smaller in cross sectional size than the other passageways the diaphragm 41 will quickly collapse, and open communication between the passageway 40 and the nozzle 31. The passageway 45 is always open to passageway 44, but passageway 45 is restricted to limit the quantity of flow through it.

Fluid from plenum chamber 15 will then flow out underneath the vehicle and will continue to levitate the vehicle until the pilot passageway 60 is again uncovered. It should be noted that because the passageway 45 is much smaller in size than the passageway 44, 60 and 61, the amount of fluid flowing through passageway 45 and out through passageway 61 is not great and will not cause any unwanted build up in pressure under diaphragm 41. The flow of fluid out nozzle 31 will continue until the port 60 again is in a region of pressure sufficiently low in relation to the control pressure in chamber 55 so the spring 48 is effective to move diaphragm 46 up to position against the sealing surfaces around passageway 44 so that the lips 57A will seal around the passageway 44. Pressure from duct 15 acting through passageway 45 and the upper part of passageway 44 will then force the diaphragm 41 to its closed position to shut off the flow of fluid out nozzle 31.

The reverse flow of fluid from under diaphragm 41 when the valve first opens causes a puff of air to be blown back out through the pilot passageway 60. There is also some flow out passageway 60 all the while the valve is open because of the communication of passageway 45 with the plenum chamber.

The reverse puff of air out through the pilot passageway 60 insures that it will be cleaned out each time if any dirt or foreign material comes into the pilot passageway, and the valve operation is fairly silent, free of moving mechanical parts, and very reliable.

If desired, different than atmospheric control pressures can be applied through separate control pressure chambers 17B in headers 17 and leading to each valve from conduits 21 and 22. The operation just described is when the conduit 21, for example, is at atmospheric pressure and is open to the control pressure chamber for the valve being actuated. If a higher than atmospheric control pressure is utilized through the opening 20, the valve will remain closed even though there is a levitated vehicle above it. The control pressure higher than atmospheric acting against the underside of the diaphragm 46 can be used to offset the pilot pressure through the valve 61. Also, a partial vacuum (lower than atmospheric pressure) can be supplied to the header and control pressure chamber 55 for a valve to open the valve at a time when there is no vehicle above the valve itself. The control pressure differential on control diaphragm 46 necessary to open the valve has to be sufficiently high to overcome the very light spring force. One psi is ample, and fractions of a pound per square inch also will work. The spring force on the control diaphragm is extremely light. By controlling the pressures in the control chamber 55 valve actuation can be automatic for levitated vehicles if desired, or can be in response to predetermined pressure signals.

The control chambers 17B for each valve also permit opening the valves for initial starting of a levitated vehicle by supplying a vacuum to the control pressure chambers while fluid pressure is in the plenum chamber. This will cause the valves to open and air to go out through the nozzles 31 of the valves so controlled. This then will lift the vehicle and by then returning the control pressure to atmospheric the unit will operate automatically. Vehicle speed can also be controlled by keeping some of the valves closed as the vehicle passes over while other valves open. The valves can be kept closed even while a vehicle is over them if the control pressure in chamber 55 is sufficiently high to prevent diaphragm 46 from moving away from block 42.

It should be noted that several valves will be controlled by the pressure in conduit 21 and several valves will be controlled by conduit 22. These valves are interspersed along the track and opening of different groups of valves at different pressures permits control of vehicle spacing or speed if desired.

What is claimed is:

1. A valve device for use with an air levitated vehicle comprising a valve housing, a main passageway defined in said housing leading from a high pressure area to a low pressure area, a flexible diaphragm member having a first surface partially defining said passageway, said passageway further being defined by a surface portion of said valve housing facing said diaphragm member, and means to subject a second surface of said diaphragm member and opposite from the first surface to a fluid pressure greater than the pressure of said low pressure area to cause said diaphragm member to deflect against the surface portion of said valve housing facing said diaphragm member thereby to seal said passageway, pressure relief means open to the second surface of said diaphragm member responsive to a predetermined condition to permit the fluid pressure acting on the second surface to be relieved, thereby to cause the first surface of the diaphragm to move away from the surface portion defining said passageway, and permit fluid flow through said passageway and means responsive to presence of said air levitated vehicle adjacent said valve device to actuate said pressure relief means.

2. The combination as specified in claim 1 wherein said pressure relief means comprises a pilot diaphragm and a pressure relief passageway, a first portion of a first side of said pilot diaphragm sealing a portion of said pressure relief passageway in a normal pilot diaphragm position, means on an opposite side of said pilot diaphragm to control the level of pressure on said first side necessary to move said pilot diaphragm away from its normal position, a second portion of said pilot diaphragm being open to a second portion of said pressure relief passageway whereby when the pressure differential on said pilot diaphragm exceeds a preselected level said pilot diaphragm moves away from its normal position and said first and second portions of said pressure relief passageway are fluidly connected and fluid under pressure acting on the second side of the first mentioned diaphragm is discharged through said pressure relief passageway.

3. The combination as specified in claim 2 wherein said pilot diaphragm forms a portion of a control pressure chamber, a control pressure conduit fluidly open to said control pressure chamber, whereby the pressure level of fluid in said control pressure conduit determines the pressure in said second portion of said pressure relief passageway necessary to move the pilot diaphragm away from its normal position.

4. The combination as specified in claim 2 wherein said second portion of said pressure relief passageway opens to a region in which pressure rises when said levitated vehicle approaches said valve device, said pilot diaphragm being urged away from its normal position by the pressure rise in the second portion caused by the levitated vehicle.

5. The valve device of claim 1 wherein said pressure relief means includes a pressure relief passageway and a pilot diaphragm normally sealing said relief passageway and movable away from said relief passageway, said relief passageway being open to the second side of the first mentioned diaphragm and under pressure when said pilot diaphragm closes said relief passageway, said housing having surfaces surrounding said opening, said pilot diaphragm having a chamber defined therein, a chamber opening aligned with said relief passageway and permitting pressure from the relief passageway to enter said chamber when the relief passageway is closed, said diaphragm having thin wall portions surrounding the chamber opening whereby pressure entering said chamber opening urges the thin wall portions against the surfaces surrounding said relief passageway when the pilot diaphragm closes the relief passageway.

6. The combination as specified in claim 1 wherein said pressure relief means comprises a pressure relief passageway, a pilot diaphragm sealing said pressure relief passageway in a normal pilot diaphragm position, and means to cause movement of said pilot diaphragm away from its normal position to open said pressure relief passageway in response to a signal indicating presence of a vehicle on said track adjacent said valve.

7. A valve device for use with an air levitated vehicle comprising a valve housing, a floor member over which said vehicle passes, said valve housing being fastened with respect to said floor member to control flow of fluid from a high pressure area below said floor member to a low pressure area above said floor member, a main passageway defined in said valve housing leading from said high pressure area to a location above said floor member, a flexible diaphragm member in said valve housing having a first surface partially defining said passageway, said passageway further being defined by a surface portion of the valve housing facing said diaphragm member, and means to subject a second surface of said diaphragm member opposite from the first surface to a fluid pressure greater than the pressure of said low pressure area to cause said diaphragm member to deflect against the surface portion of said valve housing facing said diaphragm member thereby to seal said passageway, pressure relief means open to the second surface of said diaphragm member responsive to a predetermined condition to permit the fluid pressure acting on the second surface of said diaphragm member to be relieved thereby to cause the first surface of said diaphragm member to move away from said surface portion defining said passageway, said pressure relief means comprising a pilot diaphragm and a pressure relief passageway, said pilot diaphragm sealing a portion of said pressure relief passageway leading to said first mentioned diaphragm member in a normal pilot diaphragm position, means on an opposite side of said pilot diaphragm to control the level of pressure on said first side necessary to move said pilot diaphragm away from its normal position, a second portion of said pilot diaphragm being open to a second portion of said pressure relief passageway, said second portion of said pressure relief passageway opening in a location to sense changes in pressure above said floor member adjacent said valve device.

8. The combination as specified in claim 7 wherein said floor member has valve openings therethrough, and said valve device is a self contained unit fitting into one of said openings, and twist lock means to releasably retain said valve device in an opening in said floor member.

9. A track for propelling and levitating an air levitated vehicle, said track having a floor with an upper surface, said floor defining one wall of a first duct carrying fluid under pressure at a pressure higher than atmospheric pressure for levitating said vehicle, valve means positioned with respect to said floor for controlling fluid flow from said first duct to levitate said vehicle, twist lock means cooperating between said valve means and portions of said track whereby said valve means can be inserted and replaced by engaging or disengaging the twist lock means, means defining a separate duct in said first duct comprising a control pressure header means, port means in said control pressure header means for one valve means associated with said port means, resilient sealing means between said one valve means and said control pressure header means and surrounding the corresponding port means in said header means, said resilient sealing means forming at least a portion of a passageway between said port means and portions of a corresponding valve means is locked into position with said twist lock means.

* * * * *

PO-1050
(5/69)

UNITED STATES PATENT OFFICE
CERTIFICATE OF CORRECTION

Patent No. 3,788,231        Dated January 29, 1974

Inventor(s) Roger D. Bloomfield

It is certified that error appears in the above-identified patent and that said Letters Patent are hereby corrected as shown below:

Column 6, line 58 (Claim 1, line 9) delete "and".

Signed and sealed this 18th day of June 1974.

(SEAL)
Attest:

EDWARD M. FLETCHER, JR.
Attesting Officer

C. MARSHALL DANN
Commissioner of Patents